Dec. 14, 1965    H. R. RYERSON ETAL    3,223,915
REGULATED POWER SUPPLY
Filed Jan. 11, 1962

SIMPLIFIED EQUIVALENT

INVENTORS
Herbert R. Ryerson
BY Hugh W. Busey

Their Attorney

INVENTORS
HERBERT R. RYERSON
BY HUGH W. BUSEY

THEIR ATTORNEY

United States Patent Office 3,223,915
Patented Dec. 14, 1965

1

3,223,915
REGULATED POWER SUPPLY
Herbert R. Ryerson, Garfield Heights, and Hugh W. Busey, Cleveland, Ohio, assignors to Antron Manufacturing, Inc., a corporation of Ohio
Filed Jan. 11, 1962, Ser. No. 165,489
6 Claims. (Cl. 321—18)

This invention relates to a regulated power supply and specifically to a voltage regulator for deriving a regulated unidirectional voltage from a source of alternating current.

A regulator for a D.-C. voltage obtained by rectification from an unregulated A.-C. source should desirably hold the output voltage constant at a preset value despite fluctuation in A.-C. source voltage and variation in D.-C. load current or output impedance. Desirably it should also reduce the ripple level in the D.-C. output to a low value. Transistor voltage regulators are already known which do this. In general they use a power transistor in series with the load circuit to control the load current and thereby the output voltage. The power transistor may be used in the amplifying mode, that is as a variable resistance device whereof the conductance is varied in such fashion as to maintain the output voltage constant. Except for very low current regulating applications, this mode is not favored because it entails a relatively high power loss in the transistor. Economical use of transistors requires low power losses therein. Alternatively, the power transistor may be used in the switching mode wherein it is turned consecutively fully on and fully off. This mode drastically reduces the power dissipation in the transistor and is favored for higher current regulators.

In switching mode regulators, voltage regulation may be effected in several ways. The on time may he held fixed and the off time varied; this has the disadvantage that a low frequency ripple is produced at low output voltages or currents. The off time may be held fixed and the on time varied; this tends to produce a low frequency ripple at high output voltages or currents. Low ripple frequencies are undesirable because large, heavy filter components are required to filter out the ripple. In another system, the total on and off time or cycle duration may be held fixed and only the ratio of on to off time is varied; this system has the disadvantage that the response or corrective action to an output voltage variation may be delayed by as much as one full period or duration of the on-off cycle. The frequency response, that is, the rapidity with which an output voltage variation will be corrected in such a system, is therefore limited.

The object of the invention is to provide a new and improved voltage regulator circuit which avoids the disadvantages or shortcomings of known circuits pointed out above.

In a regulated power supply embodying the invention, a rectifier section with only minor filtering provides an unregulated D.-C. output. The load current passes through the emitter-collector path of a power transistor and then through an output filter. The power transistor is operated in the switching mode, being turned fully on when the output voltage falls just below a reference level and fully off when it rises just above the reference level. The switching of the power transistor is controlled through a comparison circuit followed by an amplifier which in turn drives a trigger circuit and an interconnected reverse biasing circuit. The comparison circuit derives a control signal by comparing the output potential with a constant reference voltage. The amplifier supplies the control signal to the trigger circuit which is in the form of a regenerative switching circuit providing an output which will

2 turn the power transistor either fully on or fully off according to the level of the control signal. At the same time, the amplifier, in conjunction with the regenerative action of the trigger circuit, causes the reverse biasing circuit to apply simultaneously a reverse bias to the power transistor whenever the control signal is such as to turn the power transistor off. This is an important feature of the invention as a result of which a rapid transition from conduction to non-conduction is achieved in the power transistor which drastically reduces the power dissipation therein.

Additional features and advantages of the invention will appear from the following detailed description of a preferred embodiment illustrated in the accompanying drawings. The features of the invention believed to be novel will be more particularly pointed out in the appended claims.

Figure 1:
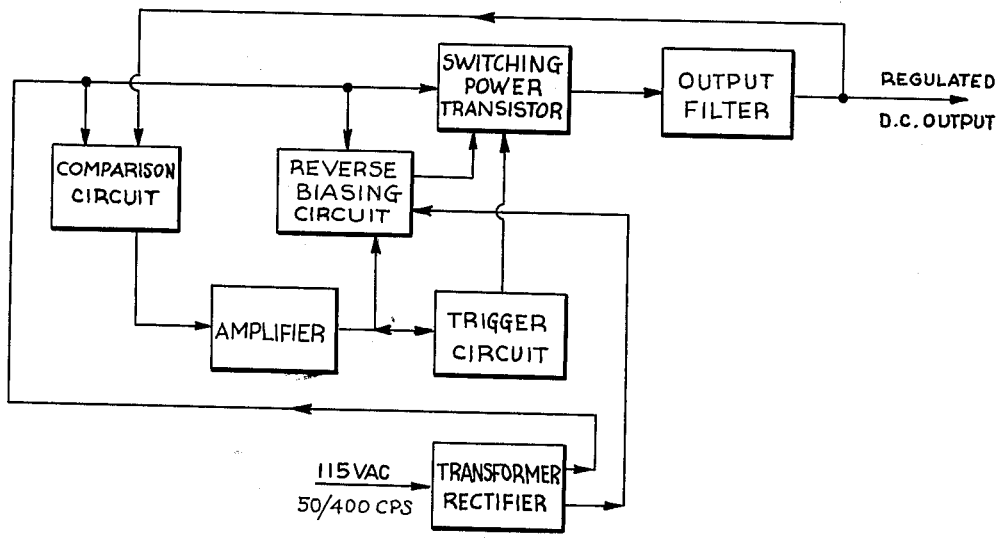
FIG. 1 is a block diagram with suitable headings of a regulated power supply embodying the invention.
Figure 3:
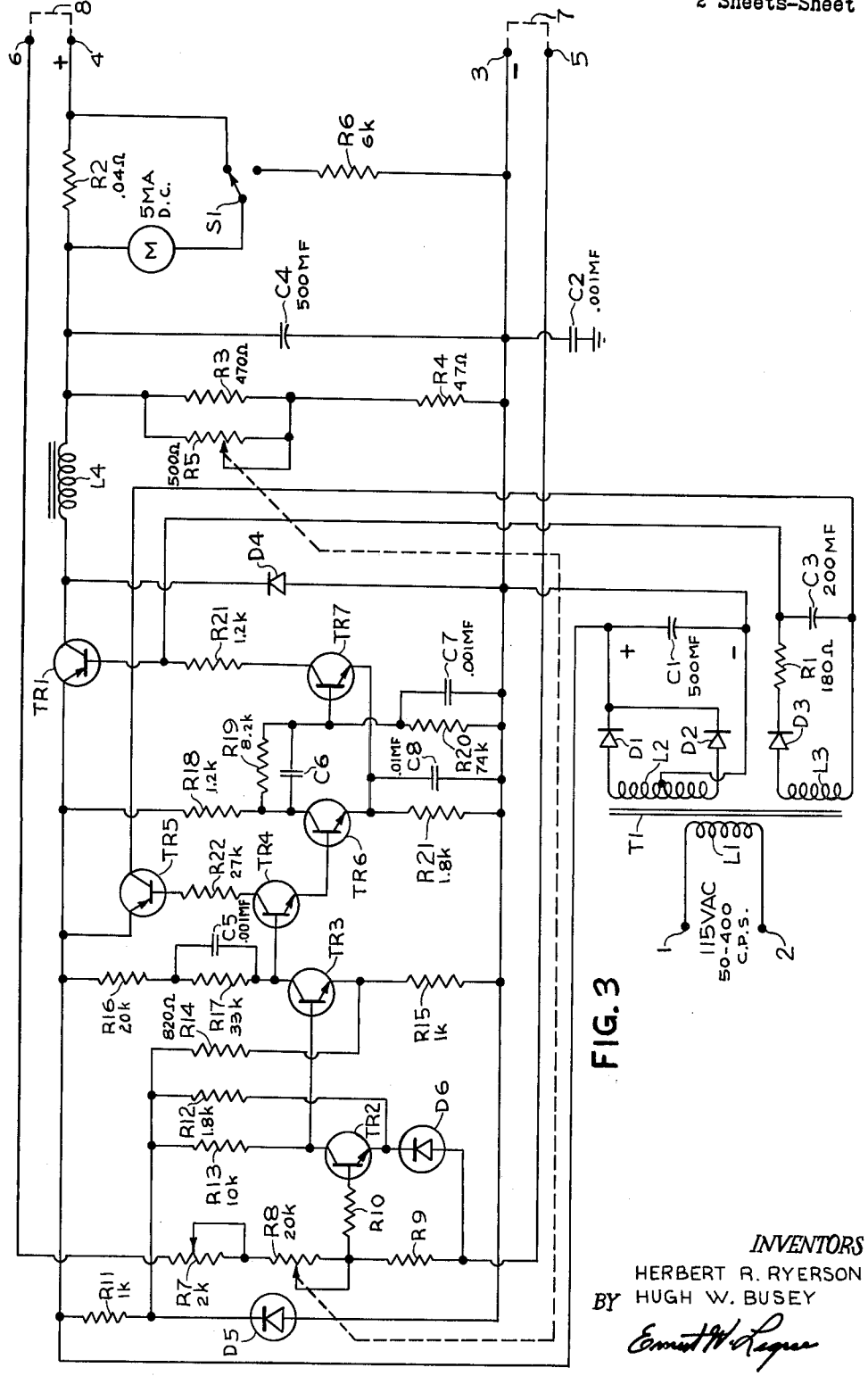
FIG. 3 is a schematic circuit diagram of the unit.

Referring to FIGS. 1 and 3, the transformer-rectifier section is a conventional full wave rectifier circuit with single capacitor filtering. It comprises a transformer T1 whose primary L1 is energized by 115 volt 50 to 400 cycle per second alternating current at terminals 1, 2. The center-tapped secondary L2 provides full wave rectification through diodes D1 and D2 for the main output with the polarity indicated, capacitor C1 providing filtering. The negative side is connected to common terminal 3 which is the negative output terminal and tied back to chassis ground through a small bypass capacitor C2 only, in order to permit the unit to be used as a positive or negative supply at will. A second lower voltage secondary L3 provides half wave rectification through diode D3 into resistance-capacitance filter R1, C3 with the polarity indicated to give a source of bias voltage.

The positive side of filter capacitor C1 in the rectifier circuit, which may be regarded as an intermediate point of unregulated D.-C. voltage, is connected through the emitter-collector path of power transistor TR1, filter inductance L4 and meter shunt resistance R2 to the positive output terminal 4. According to the conventional representation utilized, the base of the transistor is indicated by the straight line, and the emitter and collector by the angled lines, that bearing the arrowhead being the emitter. The arrow indicates the direction of current flow, opposite to electron flow. A PNP transistor is utilized but an NPN transistor could likewise be used with reversal of polarity, that is by placing the transistor in the negative side of the supply. In addition to inductance L4, the output filter comprises diode D4 which is poled to permit current flow from negative output terminal 3 to the junction of TR1 and L4, and filter capacitor C4 connected between terminal 3 and the junction of L4 and R2, that is effectively across the output terminals. Diode D4 is desirable to permit current flow through L4 to decrease more gradually when transistor TR1 is suddenly turned off and thereby to prevent excessive voltage rise at the collector. However it is not essential to use an inductance in the output filter; another form of conductive impedance such as a resistance may be used in which case diode D4 may be omitted.

The resistive bleeder network comprising resistors R3 and R4 and variable resistance R5 connected in parallel with C4, that is, effectively across the output terminals, assures a minimum current flow at all times, irrespectively of whether or not a load is connected across the output terminals. Otherwise, in the absence of a load, C4 may charge up to the peak of the unregulated rectified voltage. The meter M reads load current when switch S1 is in the upper position placing the meter in parallel with R2, and output voltage when switch S1 is in the lower position connecting the meter to voltage dropping resistor R6. Terminals 3, 4 are the load terminals and 5, 6 are the sensing terminals. When it is desired to regulate the output voltage immediately as it appears at the output terminals, jumpers are connected between the load and sensing terminals as indicated by the dotted lines 7, 8. However when the output current is sufficient to cause an appreciable voltage drop in the connecting leads, external sensing may be used by removing the jumpers and using separate leads to connect terminals 5 and 6 to appropriate points at the load.

The function of the remaining elements in the unit is to control the switching on and off of the power transistor in the necessary fashion to achieve the desired regulation. The manner in which regulation occurs may readily be understood from FIG. 2 which shows a simplified circuit wherein the power transistor is represented as an equivalent switch TR1'. The load is represented by a resistance $R_L$ connected across output terminals 3, 4. C4 is discharging continuously into $R_L$. Assume that when the voltage across C4 drops below a control level, the switch is closed. The voltage across C4 will then begin to rise. Assume further that when the voltage across C4 rises above a control level, the switch is opened. The voltage across C4 will then begin to drop. Obviously, by controlling the action of the switch or power transistor so that it opens and closes at a sufficiently rapid rate, any desired degree of regulation may be effected.

The first section of the control system is the comparison circuit. It samples the output voltage by means of the voltage divider comprising variable resistances R7 and R8, and resistor R9. Coarse and fine adjustment of the output voltage are given by R8 and R7 respectively, the former being ganged with variable resistance R5 in the bleeder network to maintain approximately constant minimum current flow at any voltage setting. The output voltage sample at the junction of R8 and R9 is applied through resistor R10 to the base of NPN transistor TR2, and is compared with a constant reference voltage which is applied to the emitter of TR2. The reference voltage is derived from the unregulated D.-C. voltage by the combination of resistor R11 and zener diode D5, and of resistor R12 and zener diode D6. Such diodes have the characteristic of maintaining a substantially contanst voltage drop under reverse conduction, as in the present circuit. Typically, diode D5 may provide a 12 volt drop, and diode D6 a 5.1 volt drop. In the operation of the circuit, an increment in sample voltage at the base of TR2 will cause an amplified control signal to be developed across the collector load resistor R13.

The amplifier section comprises two NPN transistors TR3 and TR4. The first stage transistor TR3 has its base connected directly to the collector of TR2 and bias conditions at its emitter are determined by resistors R14 and R15. The amplified control signal is developed across the collector load consisting of R16, R17 and C5, and is coupled directly to the base of second stage transistor TR4. The function of transistor TR4 is to isolate the amplifier section from the following trigger circuit section. It also drives bias switching transistor TR5 in the reverse biasing section, as will be more fully explained hereinafter.

The driving section for the power transistor TR1 is a trigger or regenerative switching circuit comprising NPN transistors TR6 and TR7. The signal at the collector load resistor R18 of input transistor TR6 is coupled forward by resistor R19 and capacitor C6 to the base of output transistor TR7 (and developed across R20 and C7). Both transistors have a common emitter impedance consisting of resistor R21, shunted to a limited extent by capacitor C8, which provides the regenerative action or positive feedback from output of TR7 to input of TR6. The trigger circuit is basically a two-stage coupled emitter amplifier whose output voltage is normally at one of two D.-C. levels depending upon the magnitude and direction of change of the input voltage. Assume that the base voltage at TR6 has dropped below the lower trigger point; TR6 at this moment is cut off and TR7 is full on. Assume now that a control signal from the amplifier causes the base voltage at TR6 to rise. Until the upper trigger point is attained nothing happens. However, as soon as the input voltage begins to rise above the upper trigger point, TR6 begins to pass current and its collector voltage begins to drop. This drop is coupled to the base of TR7; current through TR7 begins to decrease and its emitter voltage to fall. The common emitter load now causes the negative going signal to be fed back to the emitter of TR6, and feedback action is positive because the signal is in a direction to increase the original increment in base-to-emitter voltage at TR6. Thus there is regenerative feedback of the transition causing a rapid change from full on to full off in TR7 and vice versa in TR6. Subsequently, when a control signal in the reverse direction causes the voltage at the base of TR6 to drop below the lower trigger point, current through TR6 begins to decrease; immediately the reverse transistion takes place and the trigger circuit reverts to its original state.

Power transistor TR1 is turned full on or full off as governed by the state of the trigger circuit. When TR7 is turned on, it draws its collector current through R21 and the base of power transistor TR1, turning it full on. When TR7 is turned off, no base current is drawn from power transistor TR1 which is thereby cut off.

The losses in the power transistor tend to occur mainly during the interval of time taken to cut the transistor off. During this interval, current must be forced down from full load current to zero, and it is therefore important that this be done quickly. In accordance with an important feature of the invention, the emitter-base junction of the power transistor is actively reverse biased in order to speed up the fall time at the moment when its base current is cut off. It is important that the two actions be done simultaneously, that is, in exact coincidence. Also the reverse bias must be full on or full off, that is applied through a switching action for maximum effect. This is achieved through bias switching transistor TR5 whose base current must be drawn through resistor R22 and the collector-emitter path of transistor TR4. However TR4 can pass current only when TR6 in the trigger circuit is turned on (and TR7 off). Since TR6 and TR7 operate as a regenerative switch wherein either is always full on or full off, TR5 will likewise operate in switching fashion. Thus at the moment when TR6 goes on, TR5 is turned on and applies the voltage across capacitor C3 as a reverse biasing voltage to the base of power transistor TR1. This speeds up the fall time of base current through TR1 and greatly reduces the power loss therein. On the other hand, when TR6 is off and TR7 is on, TR5 will be cut off so that the reverse biasing voltage is not then applied to the base of power transistor TR1 and it is turned fully on. Thus the power transistor operates in the switching mode with minimum transition time so that its power dissipation is at the lowest level.

The operation of the circuit may be summarized by tracing through a cycle as a sample. Assume that the output voltage is dropping as capacitor C4 discharges. The base voltage of TR2 in the comparison circuit drops below its emitter voltage, turning TR2 off so that its collector voltage rises. The base voltage of TR3 in the amplifier circuit rises, causing its collector voltage to drop. This in turn tends to cut off TR4, TR5 and TR6. As TR6 starts to cut off, TR7 rapidly turns full on through regenerative switching and simultaneously turns power transistor TR1 full on. At the same time, TR5 was turned full off, thereby removing the reverse bias at the emitter-base junction of TR1. With TR1 turned full on, the supply voltage from the rectifier section is applied to the output filter, causing the output voltage to start rising. When the output voltage has risen to the point where the base voltage of TR2 exceeds its emitter voltage, TR2 turns on to start the reverse process which culminates in regeneratively turning power transistor TR1 full off with reverse bias, so that losses in the power transistor are maintained at a minimum. The output voltage then starts to drop and the cycle repeats.

Figure 2:
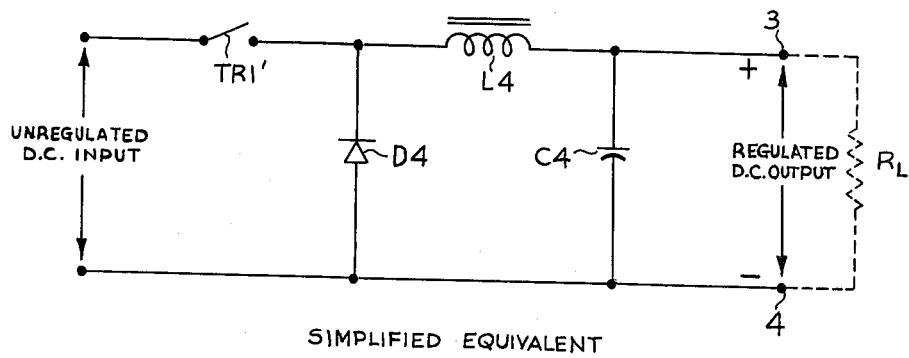
FIG. 2 is a simplified equivalent circuit to illustrate the control action.

The values of circuit elements and operating conditions indicated in FIG. 2 of the drawings are illustrative of a preferred embodiment actually constructed and tested which was a regulated low voltage power supply operating on a 105–125 volt, 50–400 c.p.s. input. The semiconductor devices (transistors and diodes) used were as follows:

| | |
|---|---|
| TR1—2N618 | D1—IN1692 |
| TR2—2N214 | D2—IN1692 |
| TR3—2N1605A | D3—IN1692 |
| TR4—2N1605A | D4—IN1692 |
| TR5—2N398 | D5—IN1524 |
| TR6—2N1605A | D6—IN751A |
| TR7—2N1605A | |

The transformer T1 had 410 primary turns, 312 secondary turns (L2), and 24 bias secondary turns (L3). Choke L4 had an inductance of .075 henrys.

This unit under test provided a regulated D.-C. output adjustable from 6 to 30 volts with combined line and load regulation of 10 millivolts. Ripple varied from approximately 4 millivolts at 6 volts output to 15 millivolts at 30 volts output. Transient recovery time was approximately 5 milliseconds with load variation from no load to full load at 30 volts output.

The preferred embodiment of the invention which has been described is intended by way of example and not by way of limitation. Various modifications will occur to those skilled in the art, particularly in the selection of transistors and in the size and ratings of circuit elements for accommodating them. The scope of the invention is therefore to be determined by the appended claims which are intended to comprehend such variations.

What we claim as new and desire to secure by Letters Patent of the United States is:

1. A voltage regulator circuit comprising a power transistor having its emitter-collector circuit connected between a source of unregulated D.-C. voltage and a load circuit terminal and means for alternatively switching said power transistor on and off in accordance with the potential at said load terminal, said means comprising a comparison circuit including a source of reference voltage and circuit means providing a control signal in accordance with the departure of said load terminal potential from said reference voltage, a regenerative switching trigger circuit receiving said control signal as input and having an output connection to the base electrode of said power transistor for switching it alternatively on and off, and an active reverse biasing circuit comprising a source of bias voltage and a transistor responsive to the state of said trigger circuit and having connections to apply said bias voltage to the base of said power transistor whenever the signal output from said trigger circuit is turning said power transistor off whereby to achieve a rapid transition from conduction to non-conduction in said power transistor.

2. A voltage regulator circuit comprising a power transistor having its emitter-collector circuit connected between a source of unregulated D.-C. voltage and a load circuit terminal and means for alternatively switching said power transistor on and off in accordance with the potential at said load terminal, said means comprising a comparison circuit including a source of reference voltage and circuit means providing a control signal in accordance with the departure of said load terminal potential from said reference voltage, a regenerative switching trigger circuit comprising input and output transistors having a common emitter impedance providing regenerative feedback, the input transistor having its collector coupled to the base of the output transistor and the output transistor drawing its collector-emitter current from the base of said power transistor, said input transistor receiving as input the control signal from said comparison circuit and being turned regeneratively fully on or off as said control signal rises above an upper trigger point or drops below a lower trigger point while said output transistor is turned conversely fully off or on, said output transistor thereby switching said power transistor off or on, and an active reverse biasing circuit comprising a source of bias voltage and a transistor connected to respond to the state of said trigger circuit and having connections to apply said bias voltage to the base of said power transistor whenever the signal output from said trigger circuit is turning said power transistor off whereby to achieve a rapid transition from conduction to non-conduction in said power transistor.

3. A voltage regulator circuit comprising a power transistor having its emitter-collector circuit connected between a source of unregulated D.-C. voltage and a load circuit terminal and means for alternatively switching said power transistor on and off in accordance with the potential at said load terminal, said means comprising a comparison circuit including a source of reference voltage and circuit means providing a control signal in accordance with the departure of said load terminal potential from said reference voltage, an amplifier comprising a first stage transistor receiving said control signal at its base and a second stage transistor having its base coupled to the collector of the first stage to receive the amplified control signal therefrom, said second stage transistor being connected to draw its collector-emitter current from the base of an active bias switching transistor, a source of bias potential, said bias switching transistor having its emitter-collector path connected in series with said source of bias potential between emitter and base of said power transistor, a regenerative switching trigger circuit comprising input and output transistors connected for regenerative feedback, said input transistor having its base connected to the emitter of said second stage transistor and being turned regeneratively fully on or off as said control signal rises above an upper trigger point or drops below a lower trigger point while said output transistor is turned conversely fully off or on, said output transistor having connections for switching said power transistor off or on, the turning on of said input transistor serving simultaneously to switch on said bias switching transistor in order to apply said bias potential to the base of said power transistor and achieve a rapid transition from conduction to non-conduction in said power transistor.

4. A voltage regulator circuit comprising a power transistor having its emitter-collector circuit connected between a source of unregulated D.-C. voltage and a load circuit terminal and means for alternatively switching said power transistor on and off in accordance with the potential at said load terminal, said means comprising a comparison circuit including a source of reference voltage and circuit including a source of reference voltage and circuit means providing a control signal in accordance with the departure of said load terminal potential from said reference voltage, an amplifier comprising a first stage transistor receiving said control signal at its base and a second stage transistor having its base coupled to the collector of the first stage to receive the amplified control signal therefrom, said second stage transistor being connected to draw its collector-emitter current from the base of an active bias switching transistor, a source of bias potential, said bias switching transistor having its emitter-collector path connected in series with said source of bias potential between emitter and base of said power transistor, a regenerative switching trigger circuit comprising input and output transistors having a common emitter impedance providing regenerative feedback, the input transistor therein having its collector coupled to the base of the output transistor and the output transistor being connected to draw its collector-emitter current from the base of said power transistor, said input transistor having its base connected to the emitter of said second stage transistor and being turned regeneratively fully on or off as said control signal rises above an upper trigger point or drops below a lower trigger point while said output transistor is turned conversely fully off or on, said output transistor thereby switching said power transistor off or on, the turning on of said input transistor serving simultaneously to switch on said bias switching transistor in order to apply said bias potential to the base of said power transistor and achieve a rapid transition from conduction to non-conduction in said power transistor.

5. A regulated power supply for deriving a regulated D.C. voltage from an alternating current source comprising a rectifier circuit providing an unregulated unidirectional voltage at an intermediate point relative to a common terminal, a power transistor having emitter, base and collector, a conductive impedance, the emitter-collector path of said power transistor and said conductive impedance being connected in series between said intermediate point and an output terminal, a diode connected between said common terminal and the junction of said transistor and conductive impedance, a capacitor connected between said common terminal and said output terminal, and means for alternatively switching said power transistor on and off in accordance with the potential at said output terminal comprising a comparison circuit including a source of reference voltage and circuit means providing a control signal proportional to the departure of the output potential from said reference voltage, an amplifier for amplifying said control signal, a regenerative switching trigger circuit receiving as input the control signal from said amplifier and having an output connection to the base electrode of said power transistor for turning it alternatively on and off, and an active reverse biasing circuit comprising a source of bias voltage and a transistor responsive to the state of said trigger circuit and having connections to apply said bias voltage to the base of said power transistor whenever the signal output from said trigger circuit is turning said power transistor off whereby to achieve a rapid transition from conduction to non-conduction in said power transistor.

6. A regulated power supply for deriving a regulated D.C. voltage from an alternating current source comprising a rectifier circuit providing an unregulated unidirectional voltage at an intermediate point relative to a common terminal, a power transistor having emitter, base and collector, a conductive impedance, the emitter-collector path of said power transistor and said conductive impedance being connected in series between said intermediate point and an output terminal, a diode connected between said common terminal and the junction of said transistor and said conductive impedance, a capacitor connected between said common terminal and said output terminal, and means for alternatively switching said power transistor on and off in accordance with the potential at said output terminal comprising a comparison circuit including a source of reference voltage and circuit means providing a control signal proportional to the departure of the output potential from said reference voltage, a regenerative switching trigger circuit comprising input and output transistors having a common emitter impedance providing regenerative feedback, the input transistor having its collector coupled to the base of the output transistor and the output transistor drawing its collector-emitter current from the base of said power transistor, said input transistor receiving as input the control signal from said comparison circuit and being turned regeneratively fully on or off as said control signal rises above an upper trigger point or drops below a lower trigger point while said output transistor is turned conversely fully off or on, said output transistor thereby switching said power transistor off or on, and an active reverse biasing circuit comprising a source of bias voltage and a transistor connected to respond to the state of said input transistor and having connections to apply said bias voltage to the base of said power transistor whenever the signal output from said output transistor is turning said power transistor off whereby to achieve a rapid transition from conduction to non-conduction in said power transistor.

References Cited by the Examiner
UNITED STATES PATENTS

| | | | |
|---|---|---|---|
| 2,984,779 | 5/1961 | Klees | 323—22 |
| 2,993,127 | 7/1961 | Noll | 323—22 |
| 3,115,600 | 12/1963 | Brolin | 323—22 |

LLOYD McCOLLUM, *Primary Examiner.*